(12) United States Patent
Lanner et al.

(10) Patent No.: US 8,321,843 B2
(45) Date of Patent: Nov. 27, 2012

(54) AUTOMATIC ANALYSIS OF AN APPLICATION'S RUN-TIME SETTINGS

(75) Inventors: Mats E. Lanner, Portland, OR (US); Christopher L. Gassib, Portland, OR (US); Eric M. Haddan, Camas, WA (US); Laurie A. Hannon, Hillsboro, OR (US); Shawn M. Hempel, Newburg, OR (US)

(73) Assignee: Tranxition Corporation, Portland, OR (US)

( * ) Notice: Subject to any disclaimer, the term of this patent is extended or adjusted under 35 U.S.C. 154(b) by 963 days.

(21) Appl. No.: 12/367,718

(22) Filed: Feb. 9, 2009

(65) Prior Publication Data

US 2010/0205416 A1   Aug. 12, 2010

(51) Int. Cl.
G06F 9/44 (2006.01)
(52) U.S. Cl. ............ 717/127; 717/121; 717/130
(58) Field of Classification Search .............. 717/120, 717/121, 130, 131
See application file for complete search history.

(56) References Cited

U.S. PATENT DOCUMENTS

| | | |
|---|---|---|
| 6,161,176 A | 12/2000 | Hunter et al. |
| 6,308,178 B1 | 10/2001 | Chang et al. |
| 6,357,038 B1 | 3/2002 | Scouten |
| 6,745,239 B1 | 6/2004 | Hubbard |
| 6,801,940 B1 | 10/2004 | Moran et al. |
| 6,871,344 B2 | 3/2005 | Grier et al. |
| 6,961,765 B2 | 11/2005 | Terry |
| 6,973,466 B2 | 12/2005 | Kaler et al. |
| 7,013,331 B2 | 3/2006 | Das |
| 7,080,159 B2 | 7/2006 | Chu et al. |
| 7,124,401 B2 | 10/2006 | Muller et al. |
| 7,194,730 B2 | 3/2007 | Pramberger |
| 7,287,259 B2 | 10/2007 | Grier et al. |
| 7,490,318 B2 | 2/2009 | Lu et al. |
| 7,712,085 B2 * | 5/2010 | McCollum et al. ........... 717/130 |
| 7,716,335 B2 * | 5/2010 | Dinker et al. ................ 709/226 |
| 7,716,651 B2 * | 5/2010 | Cukierman et al. .......... 717/130 |
| 7,757,216 B2 * | 7/2010 | Maron ......................... 717/127 |
| 7,779,389 B2 * | 8/2010 | Markov et al. ................ 717/121 |
| 7,895,579 B2 * | 2/2011 | Guerrera et al. .............. 717/125 |
| 7,937,690 B2 * | 5/2011 | Casey .......................... 717/128 |
| 8,156,477 B2 * | 4/2012 | Rozenfeld .................... 717/127 |

(Continued)

OTHER PUBLICATIONS

Warren Smith, A Framework for Control and Observation in Distributed Environments, Computer Sciences Corporation NASA Ames Research Center, 2001, pp. 2-7.*

(Continued)

*Primary Examiner* — Thuy Dao
*Assistant Examiner* — Mongbao Nguyen
(74) *Attorney, Agent, or Firm* — Tarek N. Fahmi, APC

(57) ABSTRACT

A method and system for automatic analysis of an application's runtime configuration settings is provided. The configuration processing system includes a monitoring component and an analysis component. The monitoring component observes requests for configuration information stored in configuration data stores of a monitored device. For example, the monitoring component may observe requests directed to the configuration data stores when an application starts, during runtime, and when the application exits. The monitoring component may record the observed requests in a file or data structure that may be accessed by or sent to the analysis component. Based on the observed requests of an application, the analysis component automatically identifies a reduced set of configuration settings which likely correspond to user-specific configuration settings used by the application. The configuration processing system may include a post-analysis component that displays the reduced set of configuration settings to a user for review, manual analysis, and/or verification.

36 Claims, 11 Drawing Sheets

U.S. PATENT DOCUMENTS

| | | | |
|---|---|---|---|
| 2003/0004882 | A1 | 1/2003 | Holler et al. |
| 2003/0121024 | A1 | 6/2003 | Hill et al. |
| 2004/0172622 | A1* | 9/2004 | Francis .................... 717/121 |
| 2004/0193953 | A1 | 9/2004 | Callahan et al. |
| 2006/0047793 | A1 | 3/2006 | Agrawal et al. |
| 2006/0059469 | A1* | 3/2006 | Schumacher ............. 717/127 |
| 2006/0064673 | A1* | 3/2006 | Rogers et al. ............. 717/113 |
| 2006/0136784 | A1* | 6/2006 | Prescott et al. ............ 714/38 |
| 2007/0157172 | A1* | 7/2007 | Zenz et al. ................. 717/121 |
| 2007/0168493 | A1 | 7/2007 | Sarwono et al. |
| 2007/0220496 | A1 | 9/2007 | Kasama |
| 2007/0240148 | A1 | 10/2007 | Inada |
| 2007/0256056 | A1 | 11/2007 | Stern et al. |
| 2007/0266149 | A1 | 11/2007 | Cobb et al. |
| 2007/0283346 | A1* | 12/2007 | Delgrosso et al. ........ 717/176 |
| 2008/0120386 | A1* | 5/2008 | Piccinini et al. ........... 709/206 |
| 2008/0155074 | A1* | 6/2008 | Bacinschi .................. 709/222 |
| 2008/0177994 | A1 | 7/2008 | Mayer |
| 2008/0235611 | A1 | 9/2008 | Fraley et al. |
| 2008/0244537 | A1* | 10/2008 | Wintergerst et al. ...... 717/130 |
| 2009/0133001 | A1* | 5/2009 | Rozenfeld .................. 717/127 |

OTHER PUBLICATIONS

Active Sensing, MIL-HDBK-61A: Configuration Verification and Audit, 2006, pp. 1-3.*

Matthew J. Renzelmann, Analysis of Windows Configuration Data, CS790 Project Report, 2006, pp. 3-10.*

"mValent Extends Automated Application Configuration Management to Virtualization Environments," http://virtualization.sys-con.com/read543324_p.htm, 2 pages [accessed on Jun. 1, 2008].

"Precision Computing—Discovering Registry Settings—PowerShell and Process Monitor," May 5, 2007, http://www.leeholmes.com/blog/DiscoveringRegistySettingsPowerShellAndProcessMonitor.aspx, 5 pages [accessed Jun. 1, 2008].

* cited by examiner

AUTOMATIC ANALYSIS OF AN APPLICATION'S RUN-TIME SETTINGS

BACKGROUND

Computer users configure their computers in order to most efficiently and comfortably perform typical tasks. For example, a user may configure a word processing application to include a footer containing the user's initials in every document created by the user. As another example, a user may configure an email application to automatically correct spelling errors. When a user needs to use a computer other than his own, he loses the ease of use represented by those system settings. This makes it difficult to do meaningful computer work. This problem is typically addressed by the user manually configuring the computer in the way that he is accustomed. This solution has problems of its own, including the user's familiarity and ability to remember how each application is configured, where the settings are located, and so on. Depending upon the computer's configuration, operating environment, and applications, this solution tends to be time consuming, tedious, and error prone even for experienced users. Given these problems, it is desirable to have a mechanism by which user-specified configuration settings of a computer can be identified. This would enable the user to operate any computer in a way familiar and comfortable for him.

DETAILED DESCRIPTION

Figure 1:
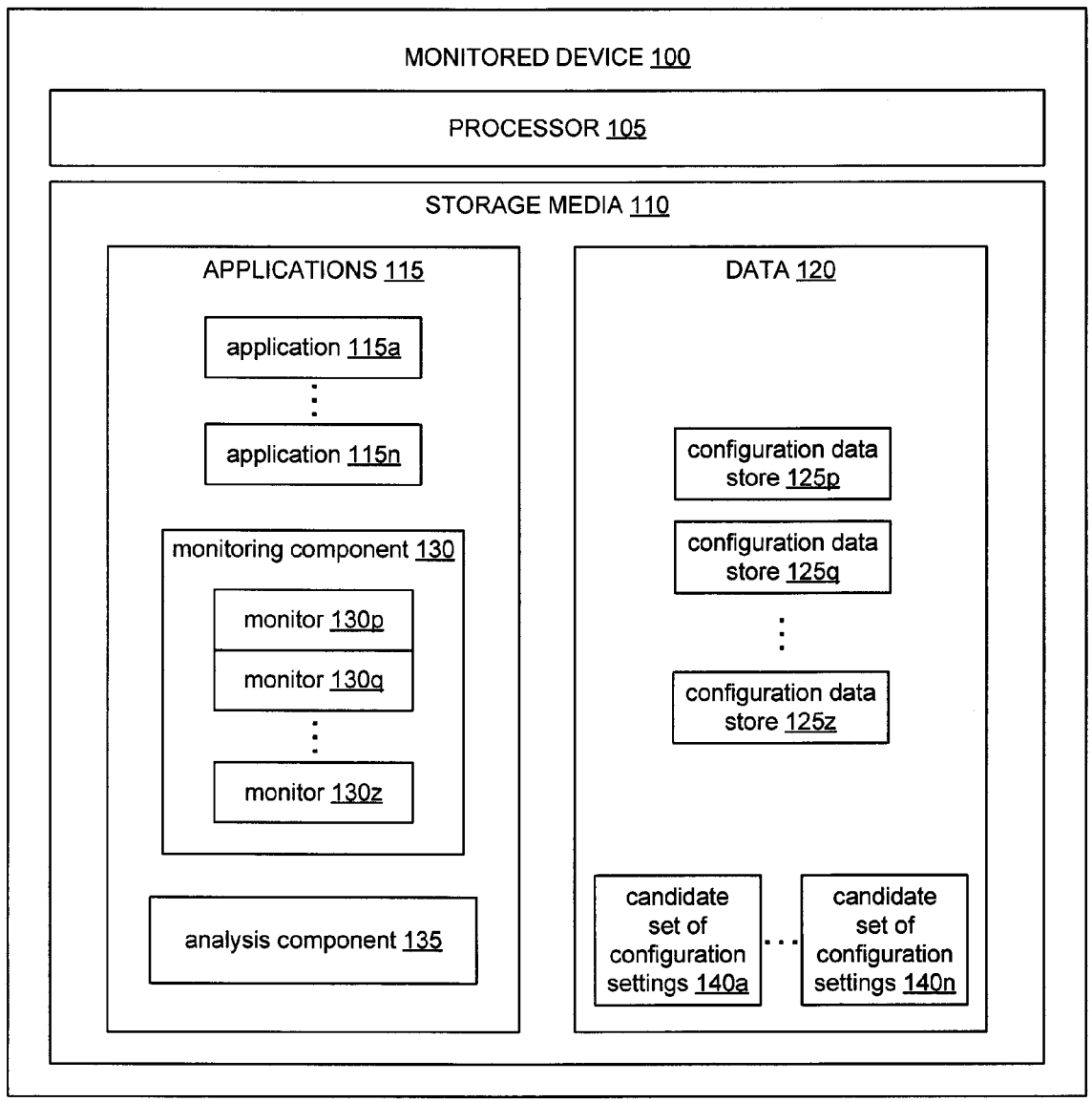
FIG. 1 is a block diagram that illustrates some of the components incorporated in a monitored device on which a configuration processing system executes in one embodiment.

A method and system for automatic analysis of an application's runtime configuration settings is provided. In some embodiments, the configuration processing system receives a selection of an application for which a subset of configuration settings is to be identified. For example, the configuration processing system may include a user interface for a user to select one or more applications, such as a word processing application, an email application, and so on. The configuration processing system identifies a subset of configuration settings used by a selected application by observing requests directed to one or more configuration data stores (e.g., a registry) and by analyzing the observed requests. In some embodiments, some or all of the identified configuration settings are identified as being user-specific configuration settings. User-specific configuration settings include application configuration settings that a user has created, deleted, or modified. For example, the configuration processing system may identify the font type of a word processing application as a configuration setting used by the word processing application, and, if the font type is, or has been, modified by a user from the default font type, then the configuration processing system may identify the font type as a user-specific configuration setting used by the word processing application. The configuration processing system may also extract and store the identified subset of configuration settings, so that the configuration settings may be used on another device.

In some embodiments, the configuration processing system includes a monitoring component and an analysis component. The monitoring component observes requests for configuration information stored in configuration data stores of a computing device (referred to herein as the "monitored device"). For example, the monitoring component may observe requests directed to the configuration data stores during initial start up of an application, while a user interacts with the application, and during final shut down of the application. Such requests typically include reading, modifying, creating, and/or deleting system or environment variables, files, registry settings, etc. (collectively referred to herein as "configuration settings"). For example, the monitoring component may observe requests directed to a configuration data store by instrumenting an application programming interface ("API") that is used by applications to access configuration settings maintained by the configuration data store. When an application calls an instrumented function of the API, the function transfers control to the monitoring component. The monitoring component then records the observed request in a file or data structure that may be accessed by, or passed directly to the analysis component. For example, the monitoring component may record information about the calling application, the access type (e.g., read, create, etc.), the setting path, the setting name, the setting value, and so on. One skilled in the art will appreciate that many different techniques may be used to observe requests for configuration settings. For example, some APIs provide a hooking mechanism through which hooks may be registered to transfer control to the monitoring component before and/or after an API function is performed.

Based on the observed requests of an application that are directed to one or more data stores, the analysis component automatically identifies a reduced set of configuration settings used by the application (referred to herein as "candidate settings"). Some or all of the candidate settings may be user-specific configuration settings. It is noted that the number of applications observed by the monitoring component may be greater than one, and that the analysis component may identify a set of candidate settings for each observed application.

However, to facilitate description, it is assumed that a user of the configuration processing system has selected a single application for which a set of user-specific configuration settings is to be generated.

In some embodiments, the analysis component includes a number of subcomponents. To identify a set of candidate settings, the analysis component may invoke one or more of its subcomponents. For example, the analysis component may invoke a filter subcomponent to remove particular types of observed requests; a correlation subcomponent to determine whether a relationships exists between observed requests directed to different configuration data stores; a fallback subcomponent to analyze failed requests; a progression subcomponent to determine whether certain observed requests can be combined into a fewer number of requests; an access subcomponent to analyze requests to read, modify, create, and/or delete configuration settings; and/or a frequency subcomponent to determine the frequency at which an application accesses particular configuration settings. It will be appreciated that the analysis component may include other subcomponents not mentioned.

In some embodiments, a user can review and/or edit configuration requests that were observed by the monitoring component before the analysis component processes the observed requests, while in other embodiments the analysis component automatically analyzes some or all of observed requests without user intervention or review. It is noted that, by automatically analyzing the observed requests, user-specific configuration settings can be identified substantially faster then if user input were required. In addition, by not requiring user input, the configuration processing system can be used by novice users.

In some embodiments, the configuration processing system includes a post-analysis component that may be invoked to display the set of candidate settings to a user for further review, manual analysis, and/or verification. For example, a user may review a set of candidate settings to verify that such settings correspond to user-specific configuration settings used by an application. As another example, a user may review the observed requests that served as the foundation for the automated analysis and, if the user desires, the user may perform additional, manual analysis to revise the set of candidate settings.

In some embodiments, the configuration processing system persistently stores the set of candidate settings, such that the user-specific configuration settings used by an application can be virtualized across a wide variety of computing devices, such as a personal computer, personal digital assistant, cell phone, digital camera, or other electronic device. It is noted that the set of candidate settings need not be verified by a user prior to being stored or virtualized. The configuration processing system may use various techniques to extract the identified configuration settings from the monitored device, such as, for example, those described in commonly-owned U.S. Pat. No. 6,728,877 of K. Mackin et al., filed on Dec. 13, 2002 and entitled "METHOD AND SYSTEM FOR AUTOMATICALLY TRANSITIONING OF CONFIGURATION SETTINGS AMONG COMPUTER SYSTEMS," which is hereby incorporated by reference. In some embodiments, the extracted configuration settings are persistently stored on another computing device, while in other embodiments the extracted configuration settings may be used by another computing device without persistently loading or storing the settings on the computing device, for example, using techniques such as those described in commonly-owned U.S. Pat. No. 7,293,170 of R. Bowler et al., filed on Oct. 13, 2005 and entitled "CHANGING THE PERSONALITY OF A DEVICE BY INTERCEPTING REQUESTS FOR PERSONALITY INFORMATION," which is hereby incorporated by reference.

In some embodiments, the system stores the extracted user-specific configuration settings on a storage medium in a canonical or application-independent form. The canonical form may be neutral in the sense that it is independent of any application program and independent of the operating system under which an application program executes. For example, the user-specific configuration settings of a word processing program (e.g., Microsoft Word), such as default font type, may be stored in a format that is independent of the word processing program through which the user-specific configuration settings were specified and/or used on the monitored device. When the extracted configuration settings are used by a recipient device that uses a different word processing application (e.g., StarOffice), the user-specific configuration settings may be converted from the canonical form to a recipient-specific form that can be used by the applications of the recipient device. In some embodiments, the canonical form is a neutral form, while in other embodiments the canonical form defaults to a form specific to an application or an operating system.

The configuration processing system may be implemented as an application layer that observes an application's requests for configuration settings and, based on the observed requests, automatically identifies a reduced set of configuration settings which likely correspond to user-specific configuration settings used by the application. The configuration processing system may be implemented by the monitored device. However, it is noted that the configuration processing system does not have to be implemented by the monitored device. For example, in some embodiments, the configuration processing system is implemented by a separate computing system to which configuration requests are provided as input.

Before considering the technology introduced herein in greater detail, it is useful to consider an environment in which a configuration processing system can be implemented. FIG. 1 is a block diagram that illustrates some of the components incorporated in a monitored device on which a configuration processing system executes in one embodiment. It is noted that the monitored device 100 may be a physical computing system or a virtual computing system. In the illustrated embodiment, the monitored device 100 includes one or more processors 105 (e.g., processors 105 may be physical or virtualized). The processors 105 are the central processing units (CPUs) of the monitored device 100 and, thus, control its overall operation. In some embodiments, the processors 105 accomplish this by executing software stored in memory and/or other computer-readable storage media of the monitored device 100. A processor 105 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

In the illustrated embodiment, storage media 110 includes computer-readable media for reading and/or persistently storing applications 115 and data 120 and memory for storing applications 115 and data 120 while they are being used. For example, storage media 110 may include a removable computer-readable storage medium such as a Universal Serial Bus ("USB") device and/or a fixed computer-readable storage medium such as a hard drive. As used herein, computer-readable storage media includes volatile, nonvolatile, removable, and non-removable media, or any combination of such media devices that are capable of storing information such as computer-readable instructions, data structures, program modules or other data. It is noted that storage media 110 may include physical or virtualized storage devices. It will be appreciated that the monitored device 100 may include other components not illustrated, such as input devices (e.g., keyboard and pointing devices), output devices (display devices), network connections, and so on.

In the illustrated embodiment, the monitored device 100 includes one or more configuration data stores 125 that maintain configuration settings of the monitored device. A user typically configures an application 115 in a way that allows the user to most efficiently and comfortably use the application. Some configuration settings are considered "global" settings in the sense that all applications executing on the monitored device share the configuration settings, while other configuration settings are specific to an application or a group of application. For example, a configuration setting that indicates the base color for a window may be global, whereas a configuration setting that indicates spelling errors are to be automatically corrected may be specific to an application (such as, for example, a word processing application or an email application). Typically, both global and application-specific configuration settings are configurable by a user. As a result, such settings may be automatically identified by the configuration processing system as user-specific configuration settings.

In the illustrated embodiment, the monitored device 100 includes a monitoring component 130 and an analysis component 135. However, in other embodiments, one or both of these components are implemented by a computing system other than the monitored device 100. The monitoring component 130 observes requests for configuration settings maintained by configuration data stores 125 of the monitored device 100.

In some embodiments, the monitoring component 130 provides an extensible framework that may be used to define a number of monitors, such as monitors 130$p$, 130$q$, . . . 130$z$. In some embodiments, the monitoring component 130 includes a monitor for each configuration data store 125 that is to be monitored, and each monitor observes requests directed to the monitor's corresponding configuration data store. For example, monitor 130$z$ may observe requests directed to a registry of the monitored device 100 when an application 115$a$ starts, during runtime, and when the application 115$a$ exits. By providing an extensible framework, the monitoring component 130 can be extended to adapt to computing environments having different or new types of configuration data stores.

The monitoring component 130 may record the observed configuration requests in a file or data structure (not shown) that may be accessed by or sent to the analysis component 135. In some embodiments, each monitor 130$p$, 130$q$, . . . 130$z$ records observed requests in a shared file or data structure, while in other embodiments each monitor records observed requests in a private file or data structure associated with the particular configuration data store 125 that it monitors. Based on the observed configuration requests, the analysis component 135 identifies a reduced set of configuration settings for each application, which correspond to user-specific configuration settings used by each application (referred to herein as "candidate settings"). For example, in the illustrated embodiment, the sets of candidate settings 140$a$ . . . 140$n$ correspond to applications 115$a$ . . . 115$n$, respectively. It will be appreciated that a set of candidate settings 140 may be empty or may include one or more configuration settings.

In some embodiments, the monitoring component 130 and the analysis component 135 are implemented as computer-executable instructions, such as software modules or applications. It is noted, however, that these components need not be stored on the same computer-readable medium or in storage media 110 of the monitored device 100. It is further noted that the computer-readable storage medium(s) on which these components are stored need not be the same computer-readable storage medium(s) on which the configuration data stores 125 or applications 115 are stored. However, to facilitate description, it is assumed that the monitoring component 130 and the analysis component 135 are stored in storage media 110 of the monitored device 100. While computing devices configured as described above are typically used to support the operation of the configuration processing system, those skilled in the art will appreciate that the system may be implemented using devices of various types and configurations, and having various components.

Figure 2:
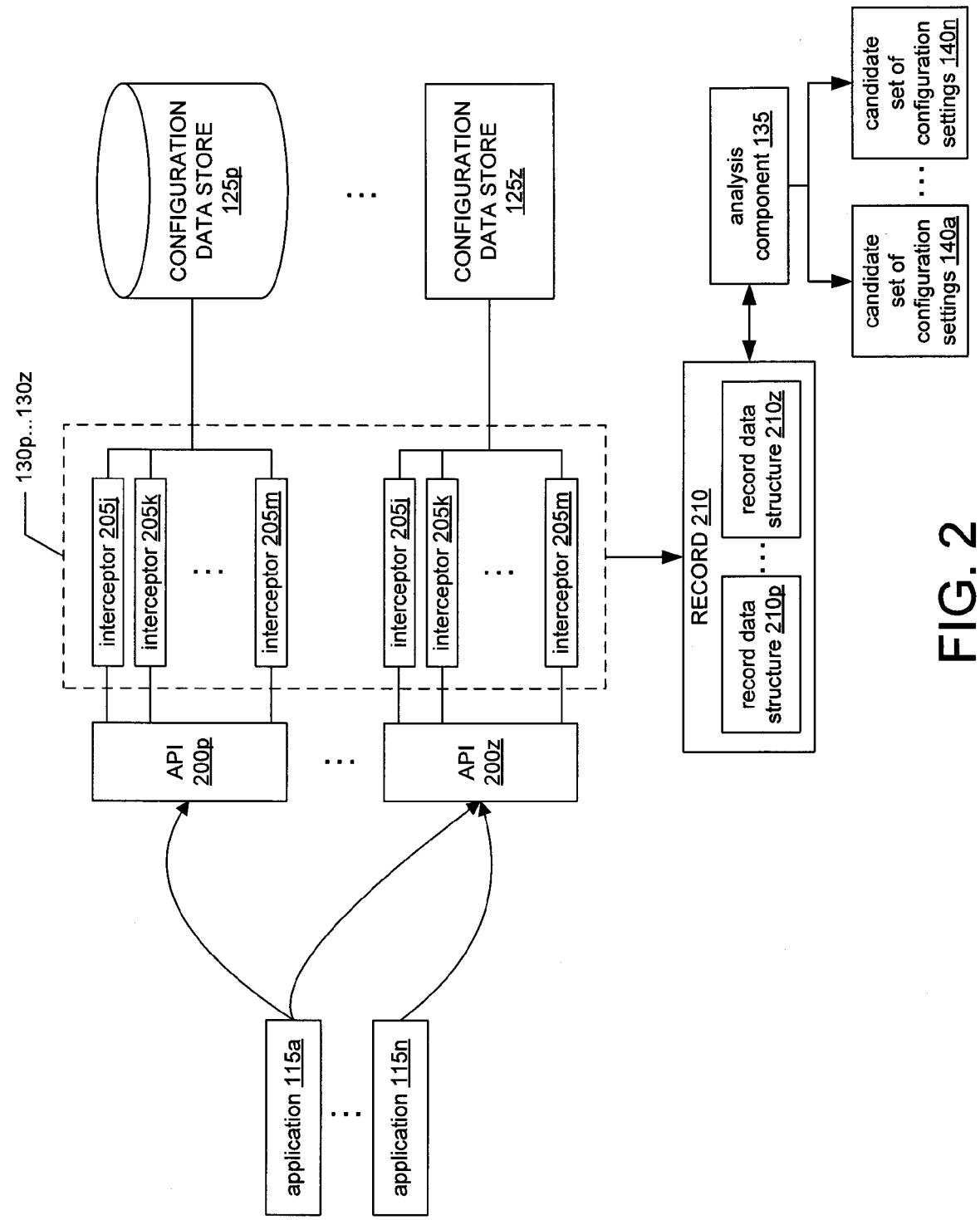
FIG. 2 is data flow diagram that illustrates how a monitoring component observes requests for configuration settings in one embodiment.

FIG. 2 is a data flow diagram that illustrates how a monitoring component observes requests for configuration settings in one embodiment. As discussed above, a configuration data store 125 typically provides an application programming interface ("API") 200 through which an application 115 may read, modify, create, and/or delete configuration settings maintained by the configuration data store 125. For example, in the Microsoft Windows operating system, the registry is accessible via a registry API, which provides the following functions:

RegCreateKey( )—creates a new registry key
RegDeleteKey( )—deletes a registry sub-key, including all its values
RegDeleteValue( )—removes a value from a registry key
RegEnumKey( )—enumerates sub-keys of a registry key
RegEnumValue( )—enumerates values for a registry key
RegSetValue( )—sets the data for a value in a registry key In the illustrated embodiment, applications 115$a$ . . . 115$n$ read, modify, create, and/or delete configuration settings maintained by configuration data stores 125$p$ . . . 125$z$ through each store's corresponding API 200. It is noted that one or more APIs may be provided for each configuration data store 125$p$ . . . 125$z$. However, to facilitate description, each it is assumed that a single API is provided for each configuration data store. For example, in the illustrated embodiment, APIs 200$p$ . . . 200$z$ correspond to configuration data stores 125$p$ . . . 125$z$, respectively.

In the illustrated embodiment, each monitor 130$p$ . . . 130$z$ installs a number of interceptors 205$j$ . . . 205$m$ to intercept requests for configuration settings. For example, a monitor 130$p$ may install interceptor 205$j$ . . . 205$m$ for each function of API 200$p$. In some embodiments, an interceptor 205 is implemented as a jump instruction that is inserted within each function of an API 200 to transfer control to the corresponding monitor 130. For example, when an application 115 invokes a function of the API 200$p$, the jump instruction will cause control to be transferred to the monitor 130$p$, which records the observed configuration request in a record file or data structure 210, and then returns. In the illustrated embodiment, each monitor 130$p$ . . . 130$z$ records observed requests in a record 210$p$ . . . 210$z$ corresponding to configuration data stores 125$p$ . . . 125$z$, respectively. However, it is noted that in other embodiments, each monitor 130$p$ . . . 130$z$ records observed requests in a single, shared record 210 (not shown). For example, a registry monitor may record information about the calling application, the access type (e.g., read, create, etc.), the registry key path, the registry key name, the registry value name, the actual value, the type of the value (DWORD, string, binary, etc.), and so on. In some embodiments, the file or data structure includes a time-stamp of each observed request such that requests observed by one monitor (e.g., a registry monitor) can be correlated with requests observed by another monitor (e.g., a file system monitor). Based on the observed requests, the analysis component 135 identifies a reduced set of configuration settings for each application 115, which likely correspond to user-specific configuration settings used by the application.

Figure 3:
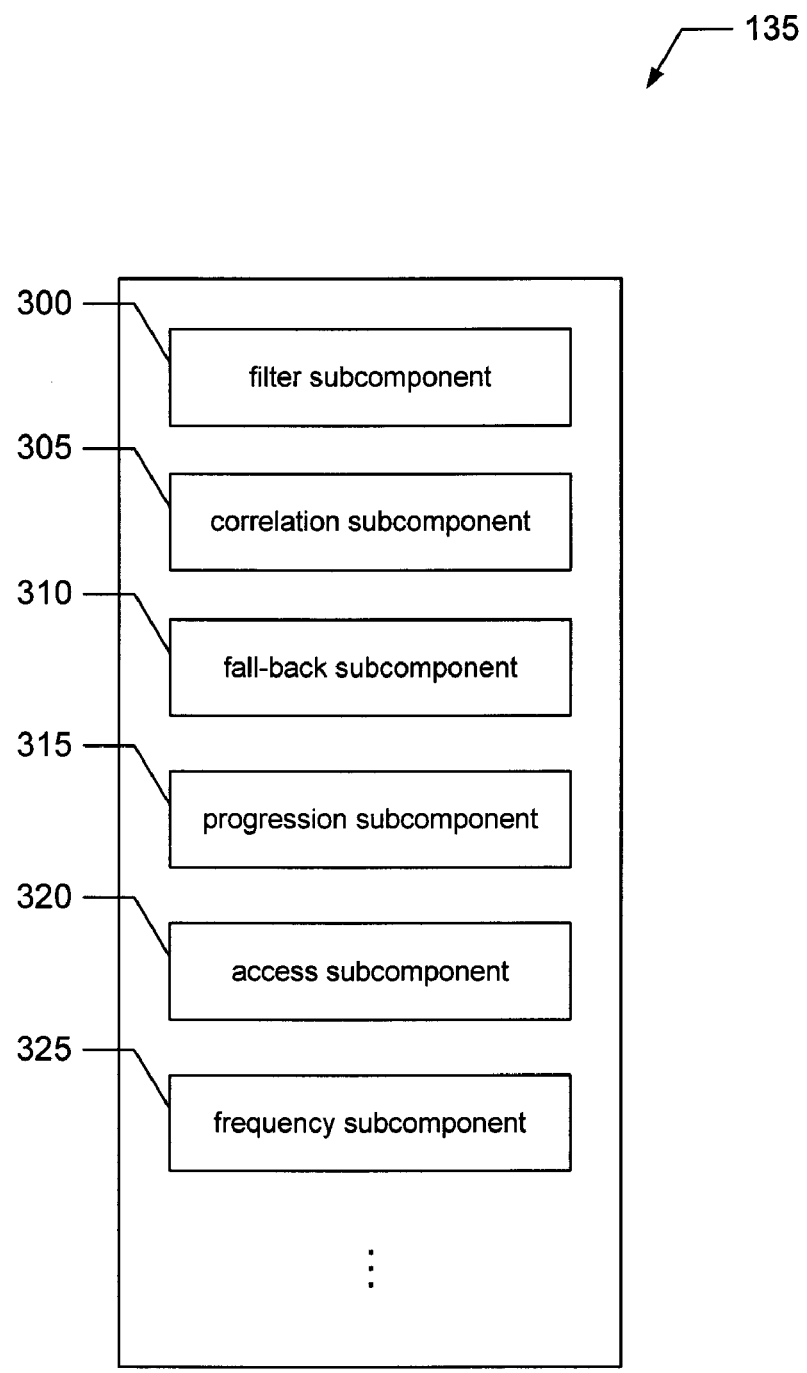
FIG. 3 is a block diagram that illustrates some of the subcomponents of an analysis component in one embodiment.

FIG. 3 is a block diagram that illustrates some of the subcomponents of an analysis component 135 in one embodiment. In the illustrated embodiment, the analysis component 135 includes a filter subcomponent 300, a correlation subcomponent 305, a fall-back subcomponent 310, a progression subcomponent 315, an access subcomponent 320, and a frequency subcomponent 325.

The filter subcomponent 300 identifies and removes certain types of observed requests, such that configuration settings associated with such requests are not be identified as candidate settings. For example, the filter subcomponent 300 may remove the following types of requests:

requests to create files or directories in various locations designated as holding temporary items or settings;
requests to delete files or directories in various locations designated as holding temporary items or settings;
requests to create and delete configuration settings while the application is running; and
requests corresponding to designated areas of a registry, file system, or other configuration data stores 125 that have been designated as not containing user-specific configuration settings;

It will be appreciated that the filter subcomponent 300 may remove other types of requests not mentioned.

The correlation subcomponent 305 determines whether relationships exists between observed requests directed to different configuration data stores 125 by the same application. The correlation subcomponent may determine that a relationship exists between an observed registry request and an observed file system request when the registry request modified a value in the registry to define a valid path (e.g., fully qualified, relative or by using environment variable expansion) for an item referenced in some way by the observed file system request. For example, if a user creates a custom dictionary in a word processing application, a new registry value is created for the custom dictionary under the custom dictionary registry key having the following path: HKEY_CURRENT_USER\Software\Microsoft\Shared Tools\Proofing Tool\1.0\Custom Dictionaries. When the custom dictionary is accessed, such as during a spell check operation, the correlation subcomponent 305 may determine that a relationship exists between the observed registry request that created the new registry value and the observed file system request to access the custom dictionary. When the correlation subcomponent 305 determines that a relationship exists between observed requests directed to different configuration data stores 125 by the same application, the correlation subcomponent may identify the configuration settings as candidate settings. In the example above, the correlation subcomponent 305 may identify the registry value and/or custom dictionary as candidate settings, which likely correspond to, or include, user-specific configuration settings used by the word processing application.

The fall-back subcomponent 310 analyzes failed requests (e.g., attempts by an application 115 to open registry keys/values and/or file system items that resulted in failure). Typically, if an application 115 requests a configuration setting that does not exist, a feature or function of the application is disabled. The fall-back subcomponent 310 determines whether an observed request succeeded immediately after the failed request. If the fall-back subcomponent 310 determines that the application 115 attempted one operation that failed, and subsequently performed a different "fall-back" operation as an alternative, the fall-back subcomponent may identify configuration settings associated with the observed fall-back request as candidate settings, which likely correspond to user-specific configuration settings used by the application 115.

The progression subcomponent 315 determines whether certain observed requests for configuration settings can be combined into a fewer number of requests. For example, the progression subcomponent 315 may analyze the following sequence of observed requests to determine whether any of the requests can be combined into a fewer number of requests:

Opens the registry key HKEY_CURRENT_USER\Software→$key_1$
Opens the key Tranxition located under $key_1$→$key_2$
Opens the key LiveManage located under $key_2$→$key_3$
Reads the value Foo located under $key_3$ In this example, the progression subcomponent 315 may combine the following observed requests into a single request indicating that the value HKEY_CURRENT_USER\Software\Tranxition\LiveManage\Foo was read by the application 115.

The access subcomponent 320 analyzes observed requests to retrieve, modify, create and/or delete configuration settings while an application 115 is running. For example, if an application 115 creates a configuration setting and does not delete that setting within the same session, the access subcomponent 320 identifies the created configuration setting as a candidate setting, which likely corresponds to a user-specific configuration setting used by the application. As another example, the access subcomponent 320 may identify configuration settings that are modified by the application 115 as candidate settings. In some embodiments, the access subcomponent 320 is invoked by the analysis component 135 after the filtering and progressing subcomponents are invoked.

The frequency subcomponent 325 determines the frequency at which an application 115 accesses configuration settings. Configuration settings which are accessed more frequently by the application 115 are then identified by the frequency subcomponent 325 as candidate settings, which may correspond to user-specific configuration settings used by the application.

The analysis component 135 invokes one or more of the illustrated subcomponents 300-325 to identify a reduced set of configuration settings for each application, which likely correspond to user-specific configuration settings used by the applications. It will be appreciated that the analysis component 135 may include other subcomponents not illustrated. For example, in some embodiments, the analysis component 135 provides an extensible framework for defining other pluggable analysis subcomponents.

Figure 4:
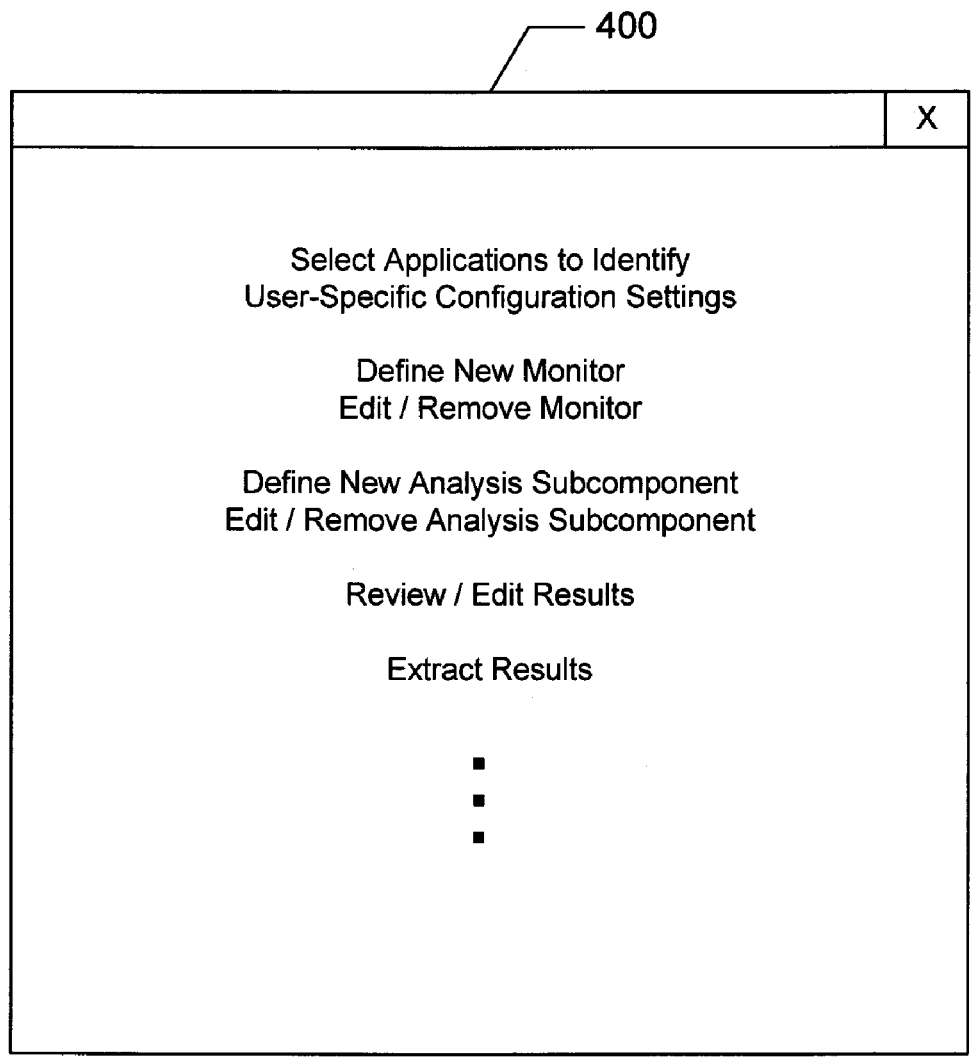
FIG. 4 is a diagram that illustrates an example user interface of a configuration processing system in one embodiment.

FIG. 4 is a diagram that illustrates an example user interface of the configuration processing system in one embodiment. The display page 400 may provide various options, such as: an option to select applications for which user-specific configuration settings are to be automatically identified; an option to define a new monitor; an option to edit or remove a monitor; an option to define a new analysis subcomponent; an option to edit or remove an analysis subcomponent; an option to review or edit results; an option to extract results, and so on. The "review/edit results" option allows a user to view and change a set of candidate settings that have been automatically identified as likely corresponding to user-specific configuration settings used by an application. The "extract results" option allows the user to extract a set of candidate settings. In some embodiments, the configuration processing system may prompt the user to review and/or edit the set of candidate settings before they are extracted. The extracted sets of candidate settings may be persistently stored by application type, setting description, and setting state.

Figure 5:
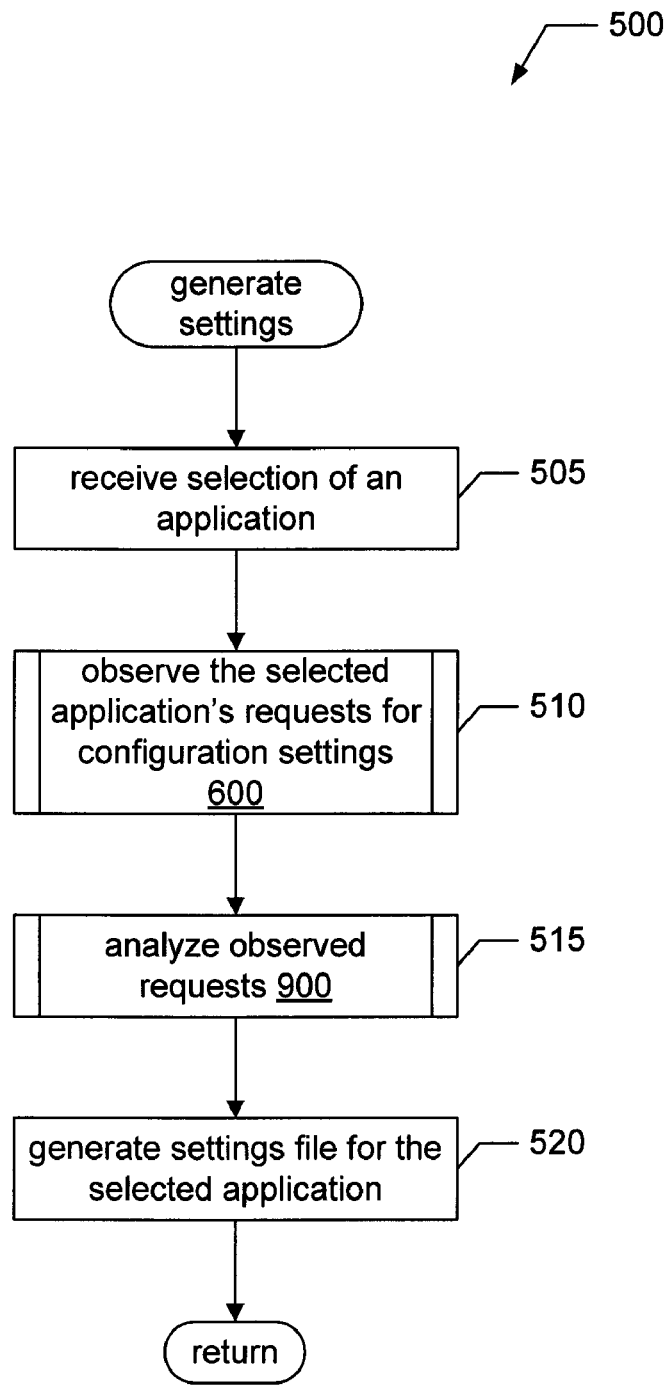
FIG. 5 is a flow diagram that illustrates a process for automatically generating user-specific configuration settings of an application in one embodiment.

FIGS. 5-11 are flow diagrams that illustrate the processing of the configuration processing system in some embodiments. FIG. 5 is a flow diagram that illustrates a process 500 for automatically generating user-specific configuration settings of an application in one embodiment. In block 505, the configuration processing system receives a selection of an application for which a reduced set of user-specific configuration settings is to be automatically generated. It is noted that the number of selected applications for which reduced sets of user-specific configuration settings are to be automatically generated may be greater than one. However, to facilitate description, it is assumed that a single application is selected for processing. In some embodiments, the selection may be received from a user of the configuration processing system, while in other embodiments the selection is received from an automated process or application.

In block 510, the configuration processing system invokes a process 600 to observe requests for configuration settings that are directed to one or more monitored configuration data stores. For example, the configuration processing system may invoke monitoring component 130 to observe requests for configuration settings when the selected application starts, during runtime, and when the selected application exits.

In block 515, the configuration processing system invokes a process 900 to analyze the observed requests. In some embodiments, the process 900 is performed by an analysis component 135 of the configuration processing system. By analyzing the observed requests, the configuration processing system identifies a reduced set of configuration settings for the selected application, which likely correspond to user-specific configuration settings used by the selected application (referred to herein as "candidate settings").

In block 520, the configuration processing system generates a settings file or data structure that includes the identified set of candidate settings. Then the process completes. In some embodiments, the generated settings file is presented to a user for review, manual analysis, and/or verification.

Those skilled in the art will appreciate that the blocks shown in FIG. 5 and in each of the following flow diagrams may be altered in a variety of ways. For example, the order of certain blocks may be rearranged; certain sub-blocks may be performed in parallel; certain shown blocks may be omitted; or additional blocks may be included; etc.

Figure 6:
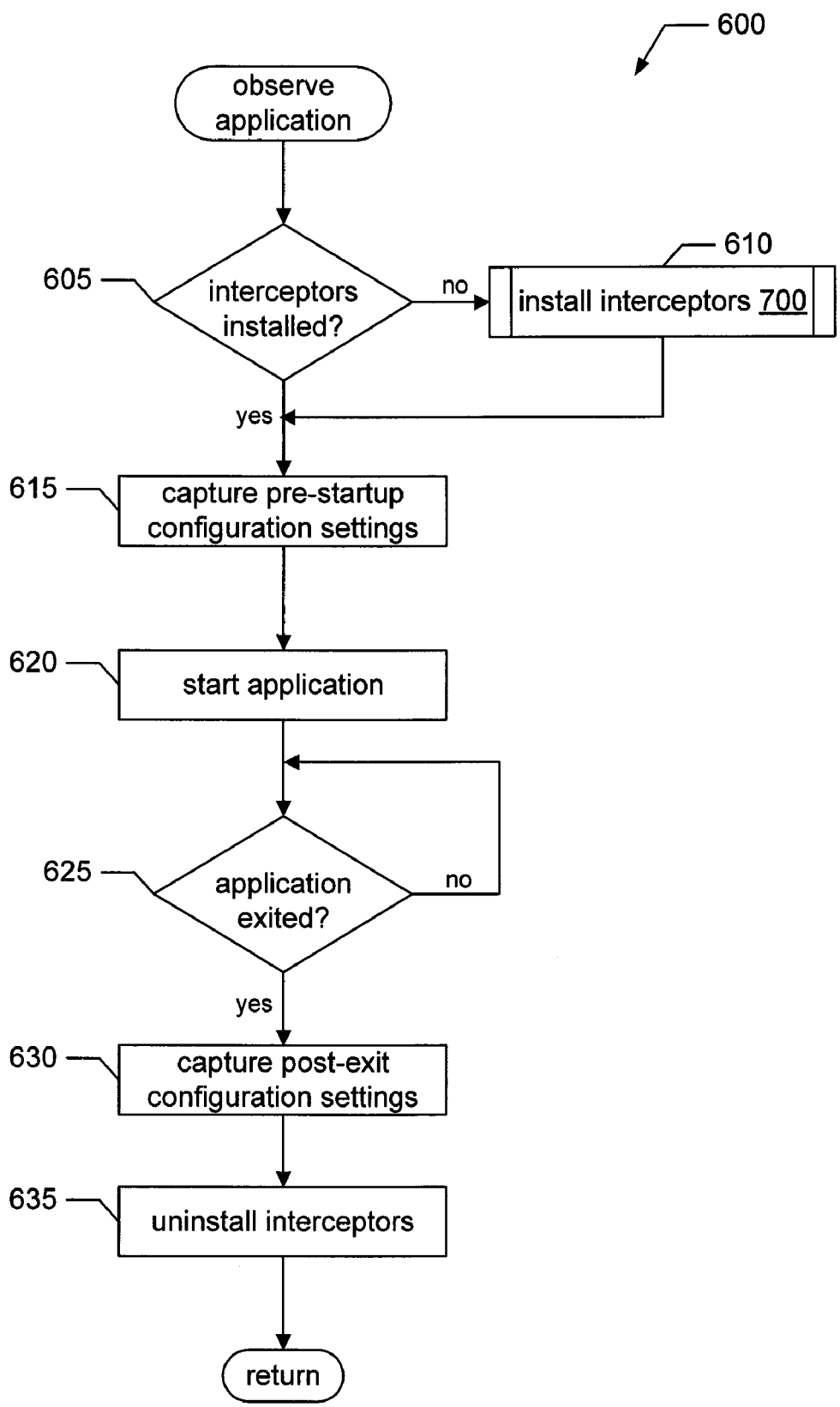
FIG. 6 is a flow diagram that illustrates a process for observing an application's requests for configuration information in one embodiment.

FIG. 6 is a flow diagram that illustrates a process 600 for observing an application's requests for configuration information in one embodiment. In decision block 605, the configuration processing system determines whether interceptors have been installed to intercept requests for configuration information. In some embodiments, an interceptor may be implemented as a jump instruction that is inserted within each function of an API to transfer control to the configuration processing system. If the configuration processing system determines that interceptors have been installed, the configuration processing system continues at block 615, as described below. Otherwise, if an interceptor has not been installed, the configuration processing system proceeds to block 610 where an install interceptors process 700 is invoked by the configuration processing system. Then the configuration processing system proceeds to block 615.

In block 615, the configuration processing system records information about configuration settings before the application starts. Then the configuration processing system proceeds to block 620. In block 620, the configuration processing system invokes the selected application, and then proceeds to block 625. At decision block 625, the configuration processing system determines whether the selected application has requested to exit. If the selected application has not requested to exit, the configuration processing system continues processing at decision block 625. Otherwise, if at decision block 625 the configuration processing system determines that the application has requested to exit, the configuration processing system proceeds to block 630. It is noted that, while the selected application is running, the installed interceptors are used to transfer control to the configuration processing system when the selected application reads, modifies, creates, and/or deletes configuration settings maintained by monitored configuration data stores. In block 630, the configuration processing system records information about configuration settings before the application exits. Then the configuration processing system proceeds to block 635. In block 635, the configuration processing system uninstalls interceptors. Then the process completes.

Figure 7:
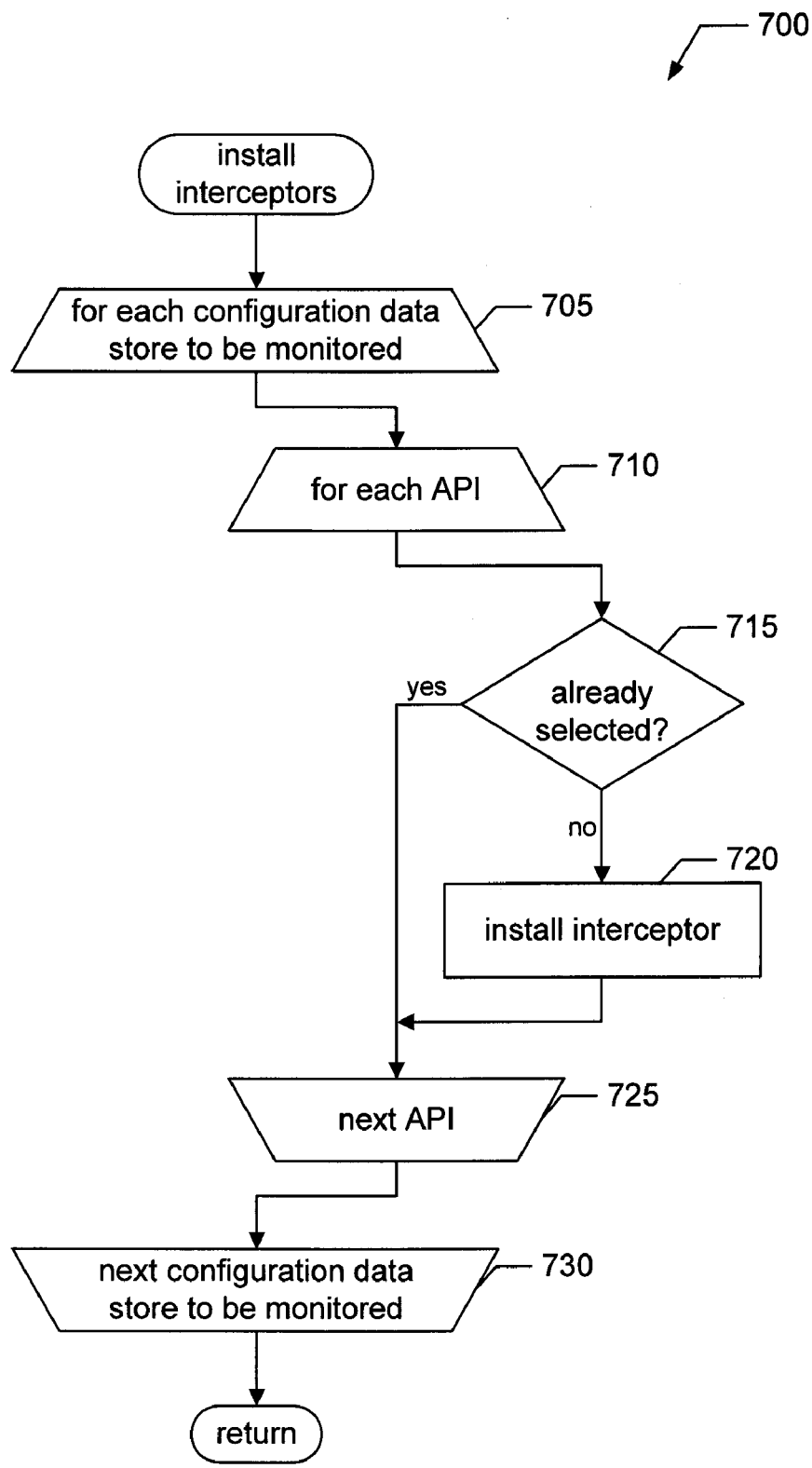
FIG. 7 is a flow diagram that illustrates a process for installing interceptors to intercept requests directed to one or more configuration data stores in one embodiment.

FIG. 7 is a flow diagram that illustrates a process for installing interceptors to intercept requests directed to one or more configuration data stores in one embodiment. The configuration processing system uses an interception mechanism appropriate to the monitored configuration data stores. In blocks 705-730, the configuration processing system loops through each configuration data store that is to be monitored the by configuration processing system. In block 705, the configuration processing system selects a configuration data store, and then proceeds to block 710. In blocks 710-725, the configuration processing system loops through each API of the selected configuration data store. As used herein, the term API may refer to a collection of functions or a single function within a collection. For example, an API for a configuration data store may be embodied as a single function though which the configuration data store receives requests to access (e.g., read, modify, create, or delete) configuration settings maintained by the configuration data store. In block 710, the configuration processing system selects an API of the selected configuration data store, and then proceeds to decision block 715. In decision block 715, the configuration processing system determines whether the selected API has already been selected. If the API was previously selected, the configuration processing system proceeds to block 725. Otherwise, if the selected API was not previously selected, the configuration processing system proceeds to block 720. In block 720, the configuration processing system installs an appropriate interception mechanism for the selected API and then proceeds to block 725. In block 725, if additional APIs remain, the configuration processing system proceeds to block 710 to select the next API. Otherwise, the configuration processing system proceeds to block 730. In block 730, if additional configuration data stores remain, the configuration processing system proceeds to block 705 to select the next configuration data store that is to be monitored by the configuration processing system. Otherwise, the process completes.

Figure 8:
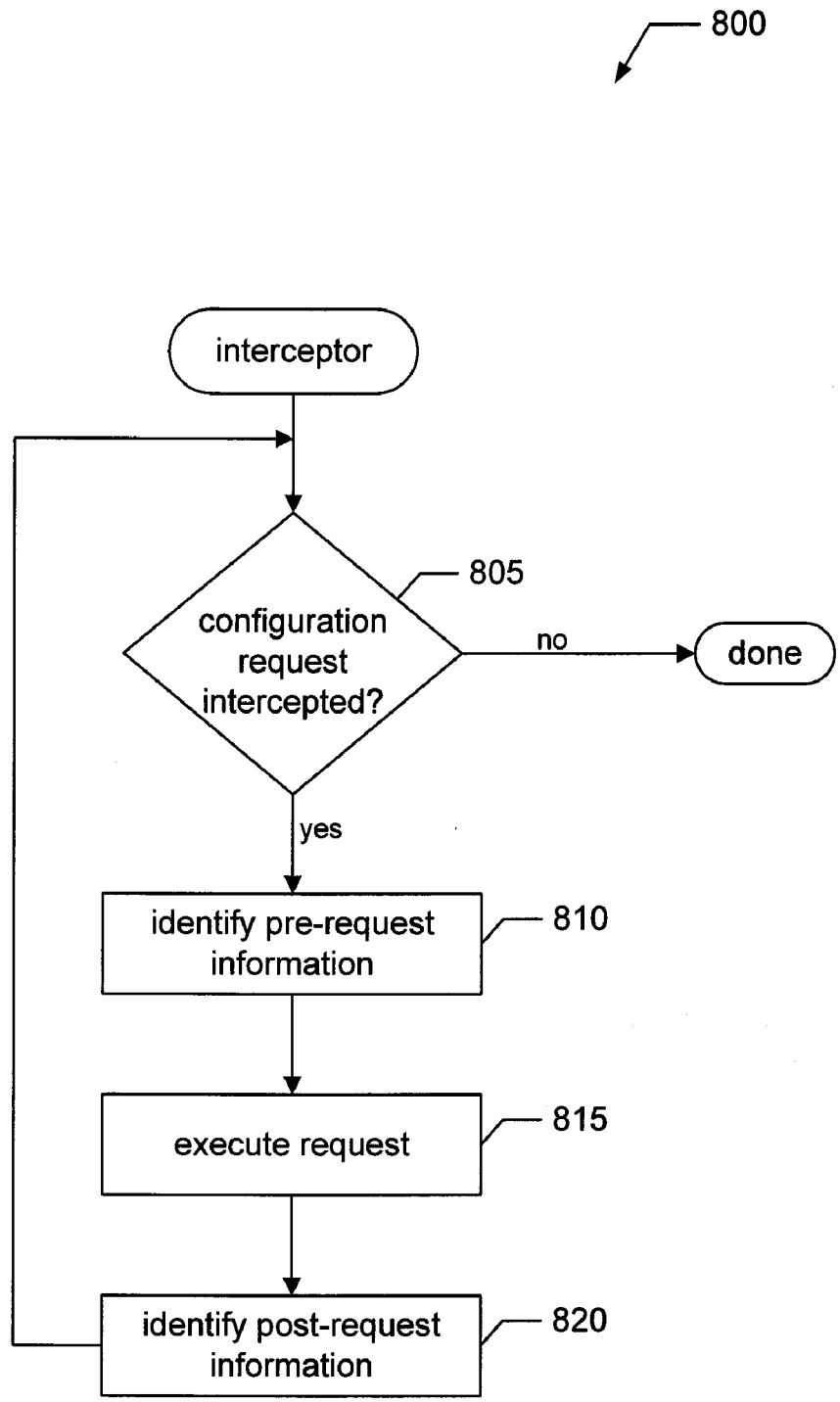
FIG. 8 is a flow diagram that illustrates an interceptor process for observing an application's runtime requests for configuration settings in one embodiment.

FIG. 8 is a flow diagram that illustrates an interceptor process 800 for observing an application's requests for configuration settings in one embodiment. The interceptor code is executed when an instrumented function of an API is called. That is, while the selected application is running, the installed interceptors are used to transfer control to the configuration processing system when the application reads, modifies, creates, and/or deletes configuration settings maintained by a monitored configuration data store. In decision block 805, the configuration processing system determines whether a configuration request has been intercepted. If a configuration request is intercepted, the configuration processing system proceeds to block 810. Otherwise, the process completes. In block 810, the configuration processing system identifies information about the configuration settings associated with the intercepted request before the request is executed, and then the configuration processing system proceeds to block 815. For example, such pre-request information may include information about the calling application, the access type (e.g., read, create, etc.), the setting path, the setting name, the setting value, and so on. In block 815, the configuration processing system executes the intercepted request, and then proceeds to block 820. In block 820, the configuration processing system identifies information about the configuration settings associated with the intercepted request after the request is executed, and then the configuration processing system proceeds to block 805 as described above. For example, such post-request information may include information about the calling application, the access type (e.g., read, create, etc.), the setting path, the setting name, the setting value, and so on. In some embodiments, the configuration processing system records the pre-request information and/or the post-request information in a file or data structure that may be analyzed to identify a reduced set of configuration settings that likely correspond to user-specific configuration settings of an observed application. In some embodiments, the configuration processing system disregards intercepted requests when the calling application is not an observed application. For example, the configuration processing system may disregard an intercepted request by exiting process 800. As another example, the configuration processing system may disregard an intercepted request by recording little or no information about the intercepted request.

Figure 9:
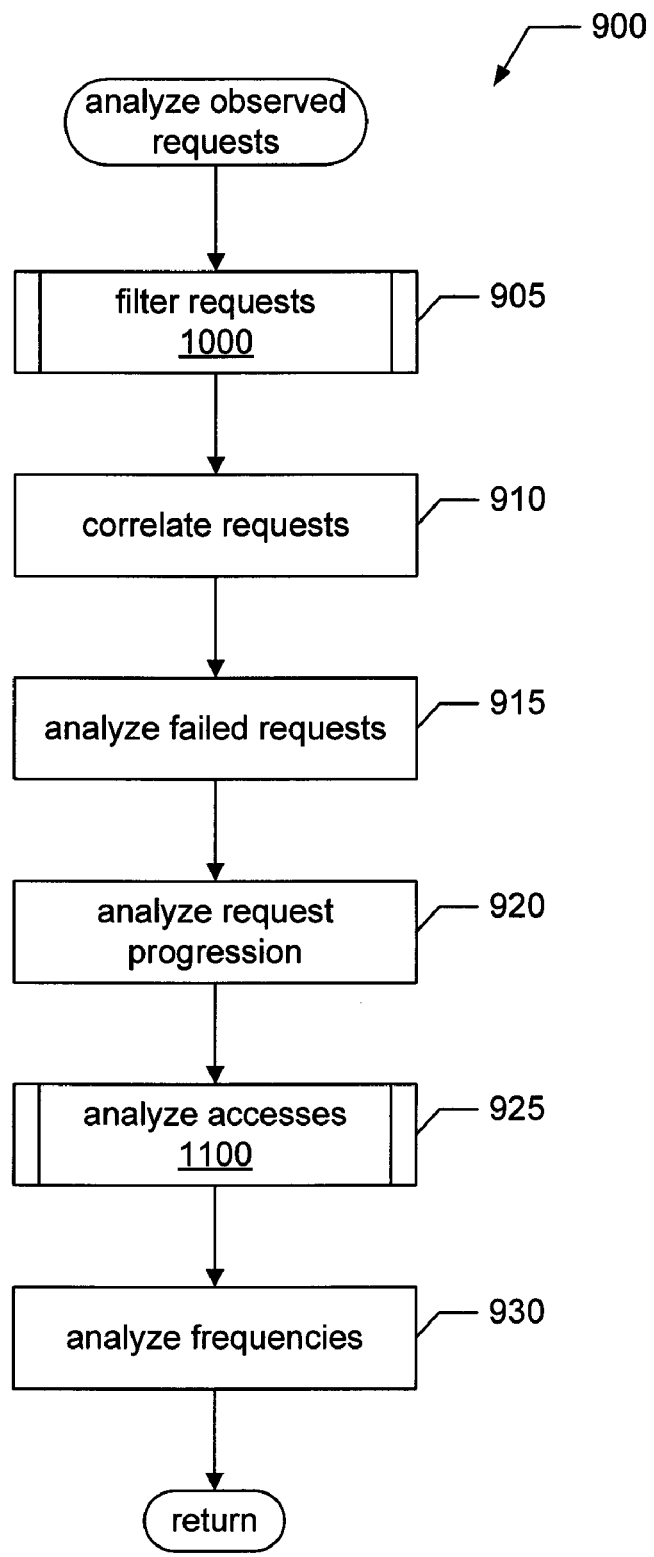
FIG. 9 is a flow diagram that illustrates a process for analyzing observed requests for configuration settings in one embodiment.

FIG. 9 is a flow diagram that illustrates a process 900 for analyzing observed requests for configuration settings in one embodiment.

In block 905, the configuration processing system filters the observed requests, and then the configuration processing system proceeds to block 910. In some embodiments, the configuration processing system filters the observed requests by invoking a filtering process 1000.

In block 910, the configuration processing system determines whether any relationship exists between observed requests that were directed to different configuration data stores by a single application. For example, the correlation subcomponent may determine that a relationship exists between an observed registry request and an observed file system request when the registry request modified a value in the registry to define a valid path (e.g., fully qualified, relative or by using environment variable expansion) for an item referenced in some way by the observed file system request. Then the configuration processing system proceeds to block 915.

In block 915, the configuration processing system analyzes failed requests, and then the configuration processing system proceeds to block 920.

In block 920, the configuration processing system analyzes the progression of the observed requests to determine whether any of the observed requests can be combined into a fewer number of requests. Then the configuration processing system proceeds to block 925.

In block 925, the configuration processing system analyzes observed requests to retrieve, modify, create and/or delete configuration settings while an application was running. In some embodiments, the configuration processing system analyzes such requests by invoking analyze access process 1100. Then the configuration processing system proceeds to block 930.

In block 930, the configuration processing system determines the frequency at which an application accesses configuration settings. Then the process completes. In some embodiments, the process 900 is performed by the configuration processing system to identify a reduced set of configuration settings that likely correspond to user-specific configuration settings of a selected application, such as an application selected in block 505 of FIG. 5.

Figure 10:
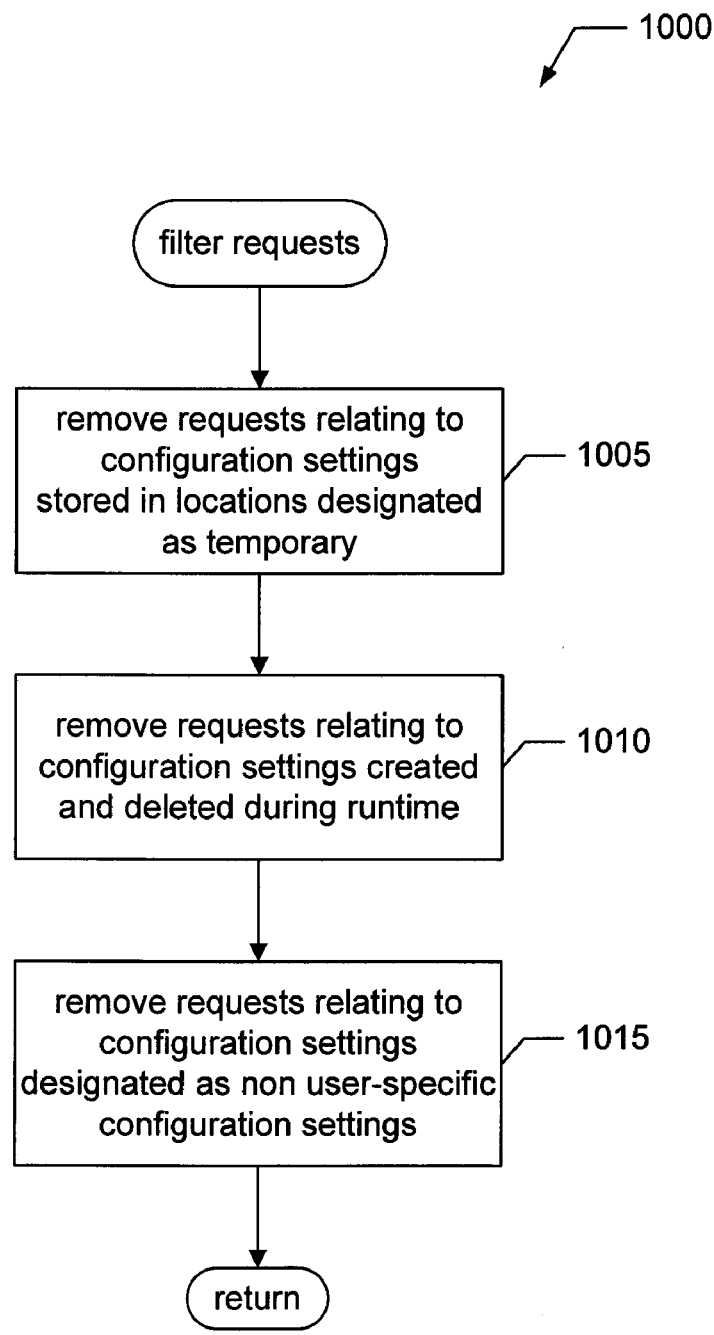
FIG. 10 is a flow diagram that illustrates a process for filtering observed requests for configuration settings in one embodiment.

FIG. 10 is a flow diagram that illustrates a process 1000 for filtering observed requests for configuration settings in one embodiment.

In block 1005, the configuration processing system removes observed requests relating to configuration settings stored in locations designated as holding temporary settings or items. Then the configuration processing system proceeds to block 1010.

In block 1010, the configuration processing system removes observed requests relating to configuration settings that were created and delete while the application was running. Then the configuration processing system proceeds to block 1015.

In block 1015, the configuration processing system removes observed requests relating to configuration settings designated as non user-specific configuration settings. The configuration processing system may also remove observed requests relating to configuration settings stored in areas of a configuration data store designated as containing non user-specific configuration settings. Then the process completes. It is noted that the configuration processing system may remove other types of requests, even though it is not illustrated as such in FIG. 10. As such, references to particular types of requests, such as temporary, non-persistent, or non user-specific, should not be taken as restrictive.

Figure 11:
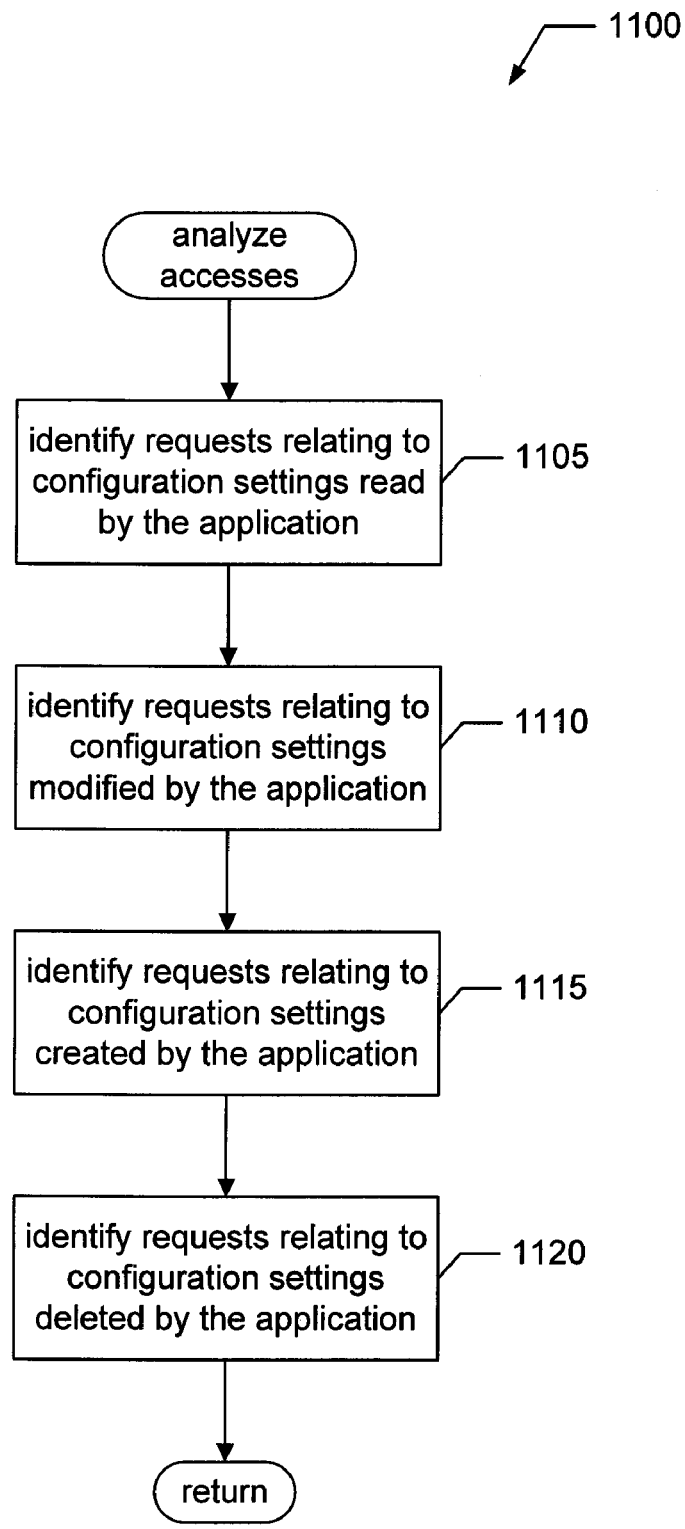
FIG. 11 is a flow diagram that illustrates a process for analyzing observed accesses to configuration settings in one embodiment.

FIG. 11 is a flow diagram that illustrates a process 1100 for analyzing observed accesses to configuration settings in one embodiment. In block 1105, the configuration processing system identifies observed requests relating to configuration settings read by the selected application. Then the configuration processing system proceeds to block 1110. In block 1110, the configuration processing system identifies observed requests relating to configuration settings modified by the selected application. Then the configuration processing system proceeds to block 1115. In block 1115, the configuration processing system identifies observed requests relating to configuration settings created by the selected application. Then the configuration processing system proceeds to block 1120. In block 1120, the configuration processing system identifies observed requests relating to configuration settings deleted by the selected application. Then the process completes.

Thus, a method and system automatic analysis of an application's runtime configuration settings has been described. Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

Although the present invention has been described with reference to specific exemplary embodiments, it will be recognized that the invention is not limited to the embodiments described, but can be practiced with modification and alteration within the spirit and scope of the appended claims. For example, in some embodiments, one or more configuration data stores may be part of a server that is connected to a user's computer via a network, such as the Internet. A monitoring component of the configuration processing system executing on the server can then observe requests made by applications executing on the user's computer for configuration settings stored in the one or more configuration data stores. Accordingly, the specification and drawings are to be regarded in an illustrative sense rather than a restrictive sense.

We claim:

1. A computer-implemented method for analyzing configuration settings of an application, the method comprising:
   receiving a selection of an application for which a subset of user-specific configuration settings is to be identified;
   observing requests directed to one or more configuration data stores, wherein at least some of the observed requests are for configuration settings used by the selected application;
   analyzing the observed requests to identify a subset of configuration settings corresponding to user-specific configuration settings used by the selected application, wherein analyzing the observed requests includes:
      analyzing a progression of the observed requests to determine whether a sequence of observed requests may be combined into a single request, and
      when a sequence of observed requests may be combined, including configuration settings associated with the single request in the identified subset of user-specific configuration settings; and
   extracting and storing the identified subset of user-specific configuration settings used by the selected application for use in another computer.

2. The method of claim 1 wherein the selection is received from a user.

3. The method of claim 1 further comprising instrumenting an application programming interface of at least one of the configuration data stores to intercept requests for configuration settings directed to the at least one configuration data store.

4. The method of claim 1 further comprising providing a user interface for a user to review the observed requests prior to the observed requests being analyzed.

5. The method of claim 1 wherein analyzing the observed requests includes:
   disregarding observed requests associated with configuration settings not used by the selected application;
   disregarding observed requests associated with configuration settings designated as non user-specific configuration settings;
   disregarding observed requests associated with configuration settings stored in a location designated as temporary; and
   disregarding observed requests associated with configuration settings that are created and deleted while the selected application is running;
   wherein configuration settings associated with the disregarded requests are not included in the identified subset of user-specific configuration settings.

6. The method of claim 1 wherein analyzing the observed requests includes:
   determining whether a relationship exists between any observed requests directed to different configuration data stores by the selected application; and
   when a relationship exists between a first observed request and a second observed request, including configuration settings associated with the first and second observed requests in the identified subset of user-specific configuration settings.

7. The method of claim 1 wherein analyzing the observed requests includes:
   identifying observed requests that failed; and for each failed request,
   determining whether another observed request was performed as an alternative to the failed request; and
   when an alternative request was performed, including configuration settings associated with the alternative request in the identified subset of user-specific configuration settings.

8. The method of claim 1 wherein analyzing the observed requests includes:
   determining a frequency at which the selected application accesses a configuration setting associated with an observed request; and
   when the frequency at which the selected application accesses a configuration setting exceeds a threshold frequency, including the configuration setting in the subset of user-specific configuration settings.

9. The method of claim 1 further comprising persistently storing the identified subset of user-specific configuration settings used by the selected application.

10. The method of claim 9 wherein the identified subset of user-specific configuration settings is persistently stored in a canonical form on a computer-readable storage medium.

11. The method of claim 10 wherein the computer-readable storage medium is a removable computer-readable storage medium.

12. The method of claim 9 wherein the identified subset of user-specific configuration settings is stored on a server and accessed by the selected application.

13. The method of claim 1 further comprising providing a user interface to display the identified subset of user-specific configuration settings used by the selected application.

14. The method of claim 13 wherein the user interface includes an option for a user to analyze the observed requests and manually edit the identified subset of user-specific configuration settings used by the selected application.

15. A configuration processing system, the system comprising:
   a processor;
   a monitoring component that, together with the processor, monitors a plurality of configuration data stores to intercept requests for configuration settings maintained by the plurality of configuration data stores; and
   an analysis component that, together with the processor, automatically analyzes the intercepted requests to generate one or more subsets of configuration settings, each generated subset containing user-specific configuration settings used by an application, wherein analyzing the intercepted requests includes:
      analyzing a progression of the intercepted requests to determine whether a sequence of intercepted requests may be combined into a single request; and
      when a sequence of intercepted requests may be combined, including configuration settings associated with the single request in the identified subset of user-specific configuration settings.

16. The system of claim 15 further comprising a user interface component that receives a selection of one or more applications for which a subset of configuration settings is to be generated.

17. The system of claim 15 further comprising a post-analysis component that provides a user interface for a user to analyze the intercepted requests.

18. The system of claim 15 further comprising an extraction component that extracts at least one of the generated subsets of configuration settings and persistently stores the at least one extracted subsets on a computer-readable storage medium.

19. The system of claim 18 wherein the monitoring component includes a monitor for each configuration data store, and wherein each monitor records intercepted requests directed to its corresponding configuration data store in a log.

20. The system of claim 19 wherein the monitoring component periodically sends the log to the analysis component.

21. The system of claim 19 wherein each monitor intercepts requests directed to its corresponding configuration data store by instrumenting an application programming interface of the configuration data store to transfer control to the corresponding monitor when the application programming interface is called.

22. The system of claim 19 wherein the monitoring component provides an extensible framework for defining monitors.

23. The system of claim 15 wherein the analysis component includes:
a correlation subcomponent that identifies a configuration setting as being a user-specific configuration setting when a relationship exists between two or more intercepted requests associated with the configuration setting, each request directed to a different configuration data store by a single application;
a fall-back subcomponent that identifies a configuration setting as being a user-specific configuration settings when the configuration setting is associated with an intercepted request that was performed in response to another intercepted request that failed;
a progression subcomponent that identifies a configuration setting as being a user-specific configuration setting when the configuration setting is associated with a sequence of intercepted requests that may be combined into the single request;
an access subcomponent that identifies a configuration setting as being a user-specific configuration setting when the configuration setting is associated with an intercepted request to read, modify, create, or delete the configuration setting; and
a frequency subcomponent that identifies a configuration setting as being a user-specific configuration setting when the configuration setting is associated with at least a threshold number of intercepted requests;
wherein each generated subset of user-specific configuration settings used by an application is generated based on the configuration settings identified by the correlation subcomponent, the fall-back subcomponent, the progression subcomponent, the access subcomponent, and the frequency subcomponent.

24. The system of claim 23 wherein the analysis component further includes a filter subcomponent that removes a configuration setting from a generated subset of user-specific configuration settings when the configuration setting: (1) is not used by the application, (2) is designated as a non user-specific configuration setting, (3) is stored in a location designated as temporary, or (4) is created and deleted while the application is running.

25. A non-transitory computer-readable storage medium encoded with instructions that, when executed by a computer system, cause the computer system to:
receive a selection of an application for which a subset of configuration settings is to be identified;
observe requests directed to one or more configuration data stores, wherein at least some of the observed requests are for configuration settings used by the selected application;
analyze the observed requests to identify a subset of configuration settings corresponding to configuration settings used by the selected application; and store the identified subset of configuration settings used by the selected application, wherein analyzing the observed requests includes:
analyzing a progression of the observed requests to determine whether a sequence of observed requests may be combined into a single request; and
when a sequence of observed requests may be combined, including configuration settings associated with the single request in the identified subset of configuration settings.

26. The non-transitory computer readable storage medium of claim 25 wherein at least some of the configuration settings stored in the identified subset are user-specific configuration settings used by the selected application.

27. The non-transitory computer-readable storage medium of claim 25 wherein the selection is received from a user.

28. The non-transitory computer-readable storage medium of claim 25 further encoded with instructions that, when executed by the computer system, cause the computer system to provide a user-interface for a user to review the observed requests and to modify the identified subset of configuration settings used by the selected application.

29. The non-transitory computer-readable storage medium of claim 25 further encoded with instructions that, when executed by the computer system, cause the computer system to extract and store the identified subset of configuration settings for use in another computer system.

30. The non-transitory computer-readable storage medium of claim 29 wherein the subset of configuration settings is stored in a canonical form.

31. The non-transitory computer-readable storage medium of claim 25 wherein at least two of the configuration settings in the identified subset of configuration settings are identified when a relationship exits between two or more observed requests associated with the at least two configuration settings, each request directed to a different configuration data store by the selected application.

32. The non-transitory computer-readable storage medium of claim 25 wherein at least one of the configuration settings in the identified subset of configuration settings is identified when the at least one configuration setting is associated with an observed request that was performed by the selected application in response to another observed request that failed.

33. The non-transitory computer-readable storage medium of claim 25 wherein at least one of the configuration settings in the identified subset of configuration settings is identified when the at least one configuration setting is associated with the sequence of observed requests that are analyzed and combined into the single request.

34. The non-transitory computer-readable storage medium of claim 25 wherein at least one of the configuration settings in the identified subset of configuration settings is identified when the at least one configuration setting is associated with an observed request to read, modify, create, or delete the at least one configuration setting.

35. The non-transitory computer-readable storage medium of claim 25 wherein at least one of the configuration settings in the identified subset of configuration settings is identified when the at least one configuration setting is associated with a threshold number of observed requests.

36. The non-transitory computer-readable storage medium of claim 25 further comprising instructions that, when executed by the computer system, cause the computer system to remove a configuration setting from the identified subset of configuration settings when the configuration setting: (1) is not used by the selected application, (2) is stored in a location designated as temporary, or (3) is created and deleted while the application is running.

* * * * *